United States Patent
Kumar et al.

(10) Patent No.: US 8,945,656 B2
(45) Date of Patent: Feb. 3, 2015

(54) JAMUN JUICE COMPOSITION AND A PROCESS THEREOF

(75) Inventors: Arunachalam Nandaa Kumar, Karnataka (IN); Usha Nandaa Kumar, Karnataka (IN)

(73) Assignee: ITC Limited, Kolkata (IN)

( * ) Notice: Subject to any disclaimer, the term of this patent is extended or adjusted under 35 U.S.C. 154(b) by 1410 days.

(21) Appl. No.: 12/198,132

(22) Filed: Aug. 26, 2008

(65) Prior Publication Data
US 2009/0061066 A1 Mar. 5, 2009

Related U.S. Application Data

(60) Provisional application No. 60/970,273, filed on Sep. 6, 2007.

(30) Foreign Application Priority Data

Aug. 27, 2007 (IN) ............................ 1912/CHE/2007

(51) Int. Cl.
  *A23L 2/02* (2006.01)
(52) U.S. Cl.
  CPC ....................................... *A23L 2/02* (2013.01)
  USPC ........... 426/599; 426/521; 426/519; 426/615; 426/655

(58) Field of Classification Search
  CPC ............... A23L 1/28; A23L 2/24; A23L 2/02; A23L 2/52; A23V 2200/00; A23V 2200/30; A23V 2200/32; A23V 2200/38
  USPC .......................... 426/599, 655, 519, 521, 615
  See application file for complete search history.

(56) References Cited

U.S. PATENT DOCUMENTS 2,393,561 A * 1/1946 Perech ........................... 426/599
4,873,112 A * 10/1989 Mitchell et al. ............... 426/599

OTHER PUBLICATIONS

Uncle Phaedrus. 2005. Today's Cases. Accessed online: http://www.hungrybrowser.com/phaedrus/m0722F05.htm.*
D. K. Salunkhe, S. S. Kadam. 1995. Handbook of fruit science and technology: production, composition, storage, and processing. CRC Press.*

* cited by examiner

*Primary Examiner* — Helen F Heggestad
(74) *Attorney, Agent, or Firm* — Winthrop & Weinstine, P.A.

(57) ABSTRACT

This invention is related to a shelf stable jamun juice composition comprising of jamun pulp, water and juice concentrate, wherein the juice concentrate is deionized fruit juice concentrate. This invention is also related to a process of preparation of the said composition. This invention also relates to a process of preparation of jamun pulp. The composition wherein, it is without added sugar and preservative is more delectable.

11 Claims, 2 Drawing Sheets

JAMUN JUICE COMPOSITION AND A PROCESS THEREOF

CROSS REFERENCE TO RELATED APPLICATIONS

This applications claims priority to U.S. Patent Application No. 60/970,273 filed Sep. 6, 2007 and Indian Patent Application No. 1912/CHE/2007 filed Aug. 27, 2007, both of which are incorporated by reference herein.

FIELD OF THE INVENTION

This invention is related to a shelf stable jamun juice composition comprising of jamun pulp, water and juice concentrate, wherein the juice concentrate is deionized fruit juice concentrate. This invention is also related to a process of preparation of the said composition. This invention also relates to a process of preparation of jamun pulp. The composition wherein, it is without added cane sugar/sweetening agent is more delectable.

BACKGROUND

The Jamun fruit forms 70% of the edible portion of the whole fruit. The juice of ripe fruit is used for preparing sauces as well as beverages. A 100% Jamun juice tastes very astringent and very thick and will not be in drinkable format. Hence commercially available jamun juice contains many additives like sweetening agents, stabilizers, colouring agents to make it more delectable. The commercially available juices also contain preservatives to give a longer shelf life.

Jamun fruit has been identified to impart various benefits in hone among them being antidiabetic property. Hence the addition of sugar, sweetening agents and other additives to the juice might not be beneficial, in particular to diabetics.

Hence to overcome the above problems we have tried to obtain a jamun juice composition which is without any added sugar or sweetening agent, preservatives and has a good shelf life.

SUMMARY OF THE INVENTION

The present invention provides jamun juice composition comprising jamun pulp at a concentration ranging from about 45 to about 65% (W/W), juice concentrate ranging from about 8 to about 9% (W/W), and water ranging from about 27 to about 46% (W/W); juice; wherein the juice concentrate is selected from a group comprising apple and pear or a combination thereof; the juice composition wherein the juice composition is without any added sugar/sweetening agent; the juice composition wherein the juice composition is without any preservative; a process for preparation of jamun juice composition comprising jamun pulp, water and juice concentrate, said process comprising steps of: thawing frozen jamun pulp; mixing the thawed jamun pulp with demineralised water to obtain a mixture; homogenizing the mixture under pressure; passing the homogenized mixture through chiller into a blending tank comprising juice concentrate in de-mineralized water; pasteurizing the blended mixture; and cooling to obtain the jamun juice composition; and a process for preparation and storing of jamun pulp, said process comprising steps of: pulping and sieving cleaned jamun fruits; pasteurizing the sieved jamun pulp; chilling the pasteurized jamun pulp; packing the chilled jamun pulp in food grade packs; freezing the packs containing the jamun pulp; and storing the frozen jamun pulp in food grade packs.

DETAILED DESCRIPTION OF THE INVENTION

Figure 1:
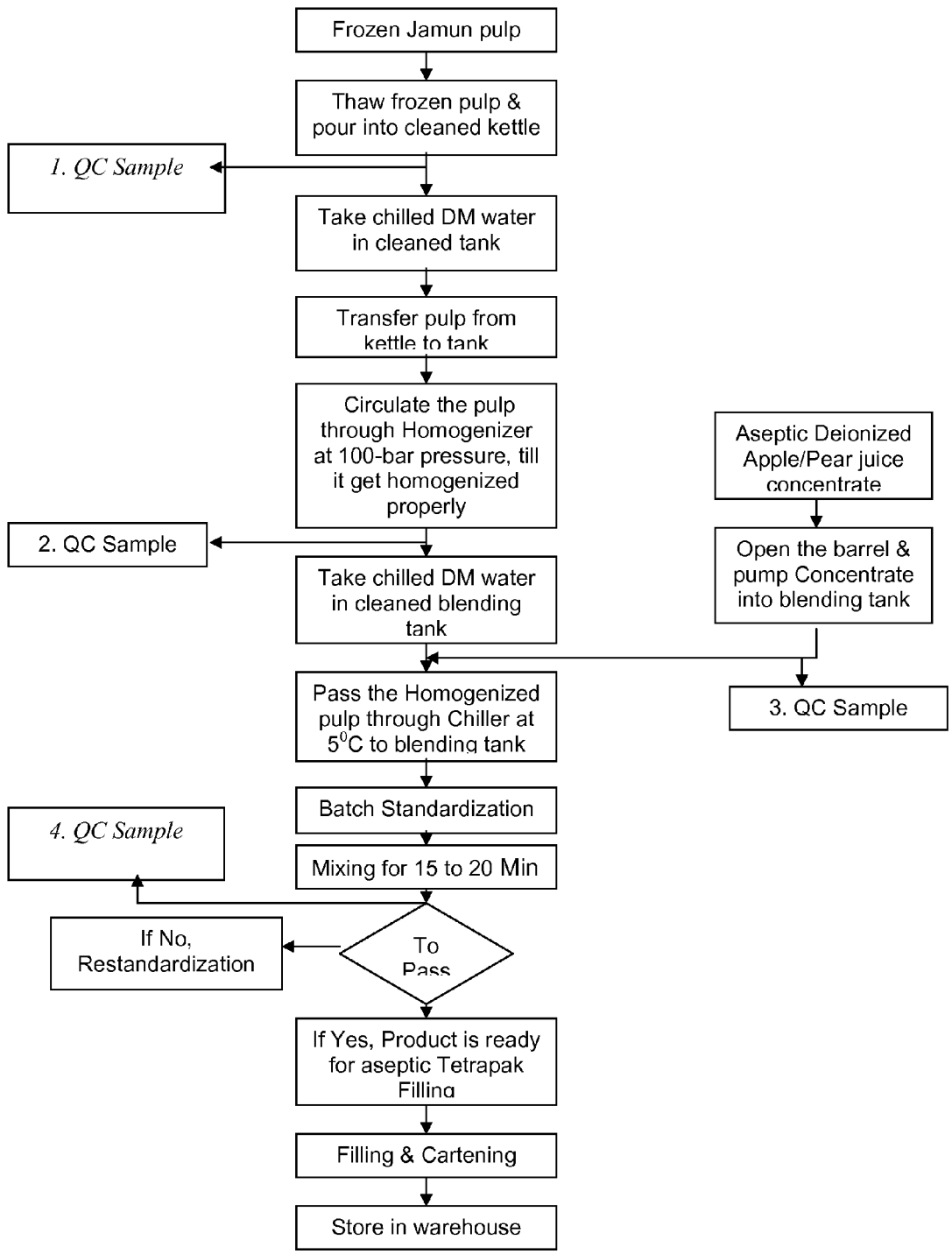
FIG. 1: Process Flow Chart For Jamun Juice Preparation

The present invention is in relation to a jamun juice composition, said composition comprising jamun pulp at a concentration ranging from about 45 to about 65% (W/W), juice concentrate ranging from about 8 to about 9% (W/W), and water ranging from about 27 to about 46% (W/W).

In another embodiment of the present invention, the juice concentrate is selected from a group comprising fruits, vegetables, leaves, and root or any combinations thereof.

In yet another embodiment of the present invention, the juice concentrate is a fruit juice concentrate.

In yet another embodiment of the present invention, the juice concentrate is selected from a group comprising apple and pear or a combination thereof.

In yet another embodiment of the present invention, the juice concentrate is in deionized form.

In yet another embodiment of the present invention, said composition is free from any externally added sugar/sweetening agent.

In yet another embodiment of the present invention, said composition is free from any preservatives.

In yet another embodiment of the present invention, said composition is shelf stable for about 8 months to about 12 months In yet another embodiment of the present invention, said composition improves palatability of jamun juice.

The present invention is also in relation to a process for preparation of jamun juice composition comprising jamun pulp, water and juice concentrate, said process comprising steps of:
  a. thawing frozen jamun pulp;
  b. mixing the thawed jamun pulp with demineralised water to obtain a mixture;
  c. homogenizing the mixture under pressure;
  d. passing the homogenized mixture through chiller into a blending tank
  e. comprising juice concentrate in de-mineralized water
  f. pasteurizing the blended mixture; and
  g. cooling to obtain the jamun juice composition.

In yet another embodiment of the present invention, wherein jamun juice composition comprising jamun pulp at a concentration ranging between about 45 to about 65% (W/W), juice concentrate at a concentration ranging between about 8 to about 9% (W/W), and water ranging from about 27 to about 46% (W/W), is obtained.

In yet another embodiment of the present invention, wherein pressure is ranging from about 100 bar to about 140 bar.

In yet another embodiment of the present invention, wherein chiller is maintained at a temperature ranging from about 4° C. to about 7° C.

In yet another embodiment of the present invention, wherein juice concentrate is selected from a group comprising apple and pear or a combination thereof.

In yet another embodiment of the present invention, wherein blending is carried out for time duration ranging from about 15 to about 20 min.

In yet another embodiment of the present invention, wherein pasteurization is carried out at temperature ranging from about 97° C. to about 99° C.

In yet another embodiment of the present invention, wherein cooling is carried out to temperature ranging from about 30° C. to about 35° C.

In yet another embodiment of the present invention, wherein palatable jamun juice composition is obtained.

The present invention is also in relation to a process for preparation and storing of jamun pulp, said process comprising steps of:
a. pulping and sieving cleaned jamun fruits;
b. pasteurizing the sieved jamun pulp;
c. chilling the pasteurized jamun pulp;
d. packing the chilled jamun pulp in food grade packs;
e. freezing the packs containing the jamun pulp; and
f. storing the frozen jamun pulp in food grade packs.

In yet another embodiment of the present invention, wherein the sieving is carried out using 1/16" and 1/32" sieve.

In yet another embodiment of the present invention, wherein the pasteurization is carried out at a temperature ranging from about 85° C. to about 90° C.

In yet another embodiment of the present invention, wherein the chilling is carried out at a temperature ranging from about 4° C. to 15° C.

In still another embodiment of the present invention, wherein the freezing is carried out at a temperature ranging from about −30° C. to −40° C.

In still another embodiment of the present invention, wherein the freezed food grade packs is stored at a temperature ranging from about −18° C. to −20° C.

In still another embodiment of the present invention, wherein the food grade pack is selected from a group comprising polyethylene, laminate comprising polyethylene terephthalate and low density polyethylene.

The present invention is also in relation to method of consumption of jamun juice composition, comprising jamun pulp at a concentration ranging from about 45 to about 65% (W/W), juice concentrate at a concentration ranging between about 8 to about 9% (W/W) and water ranging from about 27 to about 46% (W/W); said method comprises oral consumption of said composition by a user.

In still another embodiment of the present invention, said consumption is at a frequency pre-determined by user.

In still another embodiment of the present invention, said consumption is prior, after or along with a meal.

The present invention elucidates the procedure for obtaining a shelf stable jamun juice composition comprising of jamun pulp, water and juice concentrate. The composition comprises jamun pulp at a concentration ranging from about 45 to about 65% (W/W), juice concentrate ranging from about 8 to about 9% (W/W) and water ranging from about 27 to about 46% (W/W). The juice concentrate is mainly deionised apple or pear concentrate. The invention also elucidates a procedure for preparation of the jamun pulp used in the preparation of the jamun juice composition.

The present invention provides a palatable jamun juice composition without any externally added sugar or sweetening agent or preservatives. The jamun juice composition of the present invention is more palatable than a 100% jamun juice. The jamun juice composition prepared following the current procedure has been found to be more shelf stable and more delectable.

The palatability of the jamun juice composition has been evaluated by a comparative study with two commercially available jamun juices. The details of sensory evaluation of the jamun juice composition of the present invention with the commercially available jamun juices are given below in Table 1. It can be easily seen from the above data that the jamun juice composition of the present invention is more palatable as compared to the other juices. As the procedure does not use cane sugar in any of its steps, the resulting composition is suitable for diabetics also.

TABLE 1

SENSORY EVALUATION OF JAMUN JUICE
(NO. OF PANELISTS-10)

| Parameter | Sample A (mean score) | Sample B (mean score) | Sample C (mean score) |
| --- | --- | --- | --- |
| Colour | 4.0 | 2.0 | 4.0 |
| Flavour | 4.5 | 1.0 | 4.5 |
| Taste | 4.5 | 1.0 | 4.6 |
| Mouthfeel | 4.0 | 1.5 | 4.5 |
| After taste | 4.5 | 2.0 | 4.5 |
| Overall Acceptability | 4.0 | 1.5 | 4.5 |
| Mean of mean score | 4.25 | 1.5 | 4.43 |
| No. Of Panelist given First preference* | 0 | 10 | 0 |

Scores:
1: Excellent
2: V. Good
3: Good
4: Fair
5: Poor
Sample A: Yojak Associates, Unit No. 2, 3118 Tilak lane, Ratnagiri - 415612, Maharastra. Ingredients: Jamun juice, Contains permitted class II preservative. Batch No. 108-3008, Mfd: August 2007
Sample B: Jamun juice applied for patent
Sample C: RATNAGIRI PRODUCTS, Pawas Dist, Ratnagiri (India) - 415 616, Maharastra. Ingredients: Jamun juice, Contains Class II preservative. Mfd. 02 Oct 2007

The process of preparation of jamun juice composition is given in the flowchart of FIG. 1. The frozen jamun pulp is thawed and poured into cleaned kettle. This is transferred from kettle into a tank containing chilled demineralised water. The mixture is circulated through homogenizer at 100-bar to 140 bar pressure, till it is homogenized properly. The homogenized pulp is passed through chiller at 5° C. to blending tank containing aseptic deionised apple or pear juice concentrate in demineralised water. It is then blended for 15 to 20 min. The blended jamun juice is pasteurized at 97 to 99° C. for about 30-45 sec and cooled to 30 to 35° C. before it is packed in aseptic tetra packs.

The specification of the deionised pear fruit juice is given below.

Deionised Pear Concentrate Specifications:
Brix: 68 to 70 Brix
Acidity: 0.06 to 0.10% of anhydrous citric acid)
pH: 3.40 to 4.00
Deionised Apple Concentrate Specifications:
Brix: 68 to 70 Brix
Acidity: 0.06 to 0.10% of anhydrous citric acid)
pH: 3.40 to 4.00

The required jamun pulp for the preparation of the jamun juice composition is obtained by pulping it and then sieving in 1/6" and 1/32" sieve. The sieved pulp is cooled, chilled and packed in food grade polyethylene packs. The polyethylene packs are freezed and store at −18° C. The flowchart of FIG. 2 below gives the details of the process of preparation of jamun pulp.

Specification for Homogenization

Normally Jamun pulp is more pulpy and fibrous grit. So it has to be homogenized until the pulpy grit broken down to finer particles. During this step the product will be analyzed for homogenization by observing the product towards the wall of a glass beaker.

Figure 2:
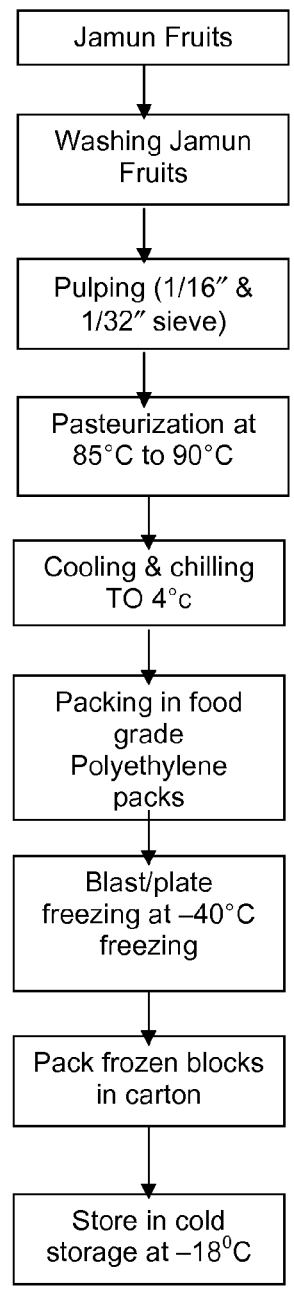
FIG. 2: Process Flow Chart For Jamun Pulp Preparation

The sample description as per FIG. 2 is given below.

Jamun Pulp Specifications:

Brix: 10 to 13.5 Brix

Acidity: 0.80 to 1.4% of anhydrous citric acid pH: 3.00 to 3.8

Colour: Natural Purple colour.

Following is the brief summary of the steps of the process of preparation of jamun juice including jamun pulp:

1) The required jamun pulp is prepared by pulping the cleaned jamun fruits in a ⅙" and ¹⁄₃₂" sieve.
2) The sieved jamun pulp is pasteurized
3) The pasteurized pulp is cooled, chilled and packed in food grade polyethylene packs.
4) The polyethylene packs containing the jamun pulp is freezed and stored at about −18° C.
5) Frozen Jamun pulp is thawed and poured into cleaned kettle.
6) The thawed frozen pulp is transferred into a cleaned tank containing chilled demineralised water.
7) The above mixture is circulated through a homogenizer at 100-bar pressure till it gets homogenized properly.
8) The homogenized pulp is taken into a blending tank containing mixture of aseptic deionized apple or pear juice and demineralised water to get the jamun juice composition.

TABLE 2

Standardization Specifications of jamun juice composition

| Sl. No. | Test Parameter | Standard Range | Result |
|---|---|---|---|
| 1 | pH | 3.20 to 3.80 | 3.30 |
| 2 | ° Brix | 11.8 to 12.2 | 12.0° Brix |
| 3 | Acidity as CA | 0.5 to 0.90 | 0.70% |
| 4 | Specific gravity | 1.040 to 1.050 | 1.050 g/ml |
| 5. | Total plate count | <10 cfu/g of pulp | <10 cfu/g of pulp |
| 6. | Yeast & Mould | <10 cfu/g of pulp | <10 cfu/g of pulp |

TABLE 3

Physiological specification of jamun pulp

| Sl. No. | Test Parameter | Specification |
|---|---|---|
| | | PHYSIOLOGICAL SPECIFICATIONS |
| 1 | Packaging | 15 Kg Frozen Ployethylene Bag in cartons/65 Kg carboys |
| 2 | Texture | Typical pulpy with grit |
| 2 | Pulp Colour | Black to dark purple colour |
| 3 | Flavour | Natural characteristic kala Jamun |
| 4 | TSS | Not less than 10 Brix |
| 5 | Acidity as anhy. CA | 0.8 to 1.4% |
| 6 | pH | 3.00 to 3.80 |
| 7 | Foreign Matter | Free from sand, insect and rodent contamination |
| 8 | No additives | No raw material other than kala Jamun |
| 9 | Preservative free | Free from added sugar, water or any other additives |
| | | MICRO BIOLOGICAL SPECIFICATIONS |
| 10 | Total Plate Count | Not more than 500 CFU/gram of pulp |
| 11 | Yeasts & moulds | Not more than 50 CFU/gram of pulp |
| 12 | *E-coli* | Absent |
| 13 | *Staphylococcus Aureus* | Absent |
| 14 | *Salmonella* | Absent |
| 15 | *Salmonella Species* | Absent |

The jamun juice composition of the present invention has been studied of its shelf life stabilities. According to the studies the jamun juice has been found to be stable without any additives for about 8 months to about 12 months. The details of the studies is tabulated in the below table. It can be seen that the for the shelf life studies various parameters like pH, brix, acidity, TPC, Y&M, taste and for the presence of any separation were studied.

TABLE 4

Shelf life studies of jamun juice composition.

| Sl. No. | Analysis | pH | Brix | Acidity | TPC | Y & M | Taste | Separation |
|---|---|---|---|---|---|---|---|---|
| 1 | 1$^{st}$ day of storage | 3.43 | 12.1 | 0.56 | Nil | Nil | Good | No |
| 2 | End of 1$^{st}$ month | 3.48 | 12.1 | 0.56 | Nil | Nil | Good | No |
| 3 | End of 2$^{nd}$ month | 3.41 | 12.1 | 0.58 | Nil | Nil | Good | No |
| 4 | End of 3$^{rd}$ month | 3.46 | 12.1 | 0.54 | Nil | Nil | Good | No |
| 5 | End of 4$^{th}$ month | 3.43 | 12.1 | 0.57 | Nil | Nil | Good | No |
| 6 | End of 5$^{th}$ month | 3.48 | 12.1 | 0.55 | Nil | Nil | Good | No |
| 7 | End of 6$^{th}$ month | 3.45 | 12.1 | 0.54 | Nil | Nil | Good | No |
| 8 | End of 7$^{th}$ month | 3.49 | 12.1 | 0.56 | Nil | Nil | Good | No |
| 9 | End of 8$^{th}$ month | 3.41 | 12.1 | 0.54 | Nil | Nil | Good | No |

Examples of preparation of jamun juice and jamun pulp is given below for understanding, however it should not be construed that it limits the scope of the invention for those examples.

Example 1

Preparation of Jamun Juice

The frozen jamun pulp, 65 g (pulp having 10 Birx) is thawed and poured into cleaned kettle. This is transferred from kettle into a tank containing chilled 27 ml of demineralised water. The mixture is circulated through homogenizer at 100-bar pressure, till it is homogenized properly. The homogenized pulp is passed through chiller at 5° C. to blending tank containing 8 g of aseptic deionised apple or pear juice concentrate in demineralised water. It is then blended for 15 to 20 min. The blended jamun juice is pasteurized at 97-99° C. for about 30-35 sec and cooled to 35° C. before it is packed in aseptic tetra packs.

Example 2

Preparation of Jamun Pulp

The required jamun pulp for the preparation of the jamun juice composition is obtained by pulping jamun and then sieving in ⅛" and ¹⁄₃₂" sieve. The sieved pulp is pasteurized at 85° C. to 90° C. cooled, chilled and packed in food grade polyethylene packs. The polyethylene packs are freezed at −40° C. and stored at −18° C.

We claim:

1. An additive-free jamun juice composition, said composition consisting of jamun pulp at a concentration ranging from about 45 to about 65% (W/W), deionized juice concentrate ranging from about 8 to about 9% (W/W) and water ranging from about 27 to about 46% (W/W).

2. The composition as claimed in claim 1, wherein the juice concentrate is selected from a group comprising fruits, vegetables, leaves, and root or any combinations thereof.

3. The composition as claimed in claim 1, wherein the juice concentrate is a fruit juice concentrate.

4. The composition as claimed in claim 1, wherein the juice concentrate is selected from a group comprising apple and pear or a combination thereof.

5. The composition as claimed in claim 1, wherein said composition is free from any externally added sugar/sweetening agent.

6. The composition as claimed in claim 1, wherein said composition is free from any preservatives.

7. The composition as claimed in claim 1, wherein said composition is shelf stable for about 8 months to about 12 months.

8. The composition as claimed in claim 1, wherein said jamun pulp improves palatability of jamun juice composition.

9. A method of consumption of an additive-free jamun juice composition, consisting of jamun pulp at a concentration ranging from about 45 to about 65% (W/W), deionized juice concentrate at a concentration ranging between about 8 to about 9% (W/W) and water ranging from about 27 to about 46% (W/W); said method comprises oral consumption of said composition by a user.

10. The method as claimed in claim 9, wherein said consumption is at a frequency pre-determined by user.

11. The method as claimed in claim 9, wherein said consumption is prior, after or along with a meal.

* * * * *